United States Patent
Reichenbach et al.

(10) Patent No.: US 8,360,316 B2
(45) Date of Patent: Jan. 29, 2013

(54) TAKING UNDISTORTED IMAGES OF MOVED OBJECTS WITH UNIFORM RESOLUTION BY LINE SENSOR

(75) Inventors: Jürgen Reichenbach, Emmendingen (DE); Roland Gehring, Elzach (DE); Michael Wiegers, Freiburg (DE); Jan Reich, Elzach (DE)

(73) Assignee: Sick AG, Waldkirch (DE)

( * ) Notice: Subject to any disclaimer, the term of this patent is extended or adjusted under 35 U.S.C. 154(b) by 547 days.

(21) Appl. No.: 12/222,285

(22) Filed: Aug. 6, 2008

(65) Prior Publication Data

US 2009/0039157 A1  Feb. 12, 2009

(30) Foreign Application Priority Data

Aug. 10, 2007 (EP) .................................. 07 015 756

(51) Int. Cl.
*G06K 7/00* (2006.01)
(52) U.S. Cl. .................... 235/436; 235/462.11
(58) Field of Classification Search .................. 348/159; 235/436, 462.11, 462.24, 462.23

See application file for complete search history.

(56) References Cited

U.S. PATENT DOCUMENTS

| | | | |
|---|---|---|---|
| 5,115,121 A | 5/1992 | Bianco et al. | |
| 5,308,960 A | 5/1994 | Smith et al. | |
| 5,448,078 A | 9/1995 | Nakazawa | |
| 5,923,017 A | 7/1999 | Bjorner et al. | |
| 5,982,483 A | 11/1999 | Lauinger et al. | |
| 5,991,470 A | 11/1999 | Swithers et al. | |

(Continued)

FOREIGN PATENT DOCUMENTS

| | | |
|---|---|---|
| EP | 0 204 516 A2 | 12/1986 |
| EP | 0833270 A2 | 4/1998 |

(Continued)

OTHER PUBLICATIONS

Notice of Opposition filed with the EPO on Nov. 10, 2010, for European Patent No. 2 026 249, nineteen (19) pages.

(Continued)

*Primary Examiner* — Thien M Le
*Assistant Examiner* — Sonji Johnson
(74) *Attorney, Agent, or Firm* — Nath, Goldberg & Meyer; Jerald L. Meyer (57) ABSTRACT

An apparatus (10), in particular a code reader, for the taking of undistorted images of a surface of objects (14) moved on a conveying device (12) is set forth, wherein the apparatus (10) has a geometry detection sensor (18) which is made for the detection of the geometry of the objects (14) with reference to spacing data and/or to the remission behavior of the objects (14) as well as a line sensor (20), in particular a line camera, which can scan the objects (14) linewise for the generation of image data of the surface in a linear reading window (22) which forms an angle with the conveying direction. In this connection, a control (24) is provided which is made to generate, on the basis of geometrical data of the geometry detection sensor (18), a respective spacing profile of the surface over the reading window (22) from the perspective of the line sensor (20) and to generate an associated zoom factor and/or a taking frequency for the line sensor (20) from each spacing profile; to set the line sensor (20) to the associated zoom factor and/or to the taking frequency for the respective line of the objects (14) to be scanned; and to compose the image data thus taken linewise in an undistorted manner to form a uniformly resolved total image of the surface.

20 Claims, 3 Drawing Sheets

U.S. PATENT DOCUMENTS

| | | | |
|---|---|---|---|
| 6,032,536 | A | 3/2000 | Peeters et al. |
| 6,061,645 | A | 5/2000 | Bengala et al. |
| 6,749,110 | B2* | 6/2004 | Hecht ............... 235/462.22 |
| 7,161,688 | B1 | 1/2007 | Bonner et al. |
| 2002/0014533 | A1 | 2/2002 | Zhu et al. |
| 2003/0006285 | A1 | 1/2003 | Hecht et al. |
| 2003/0053513 | A1 | 3/2003 | Vatan et al. |
| 2003/0156303 | A1 | 8/2003 | Schnee et al. |
| 2003/0206305 | A1 | 11/2003 | Gagliano |
| 2006/0076415 | A1* | 4/2006 | Reichenbach et al. ........ 235/454 |
| 2007/0090191 | A1 | 4/2007 | Schnee et al. |
| 2007/0268530 | A1* | 11/2007 | Gagliano et al. ............. 358/496 |
| 2009/0095600 | A1 | 4/2009 | Reichenbach et al. |

FOREIGN PATENT DOCUMENTS

| | | |
|---|---|---|
| EP | 0851376 A1 | 7/1998 |
| EP | 0 833 270 | 3/2005 |
| EP | 1 777 487 A2 | 4/2007 |
| WO | 00/27549 A1 | 5/2000 |
| WO | 02/43195 A2 | 5/2002 |
| WO | 02/092246 | 11/2002 |
| WO | 03/044586 A1 | 5/2003 |
| WO | 2008/078129 A1 | 7/2008 |

OTHER PUBLICATIONS

Office Action, Non-Final Rejection, U.S. Appl. No. 12/285,528, mailed on Jul. 1, 2011. nine (9) pages.
Office Action, Non-Final Rejection, U.S. Appl. No. 12/285,528, mailed on Jul. 23, 2010, eight (8) pages.
Office Action, Final Rejection, U.S. Appl. No. 12/285,528, mailed on Nov. 24, 2010, ten (10) pages.
Sorter Control to Camera Interface Description of the Torsvik Installation, Beumer-Specification BSC<-->CCD Camera DV 9000, Torsvik Sorting Center, three (3) pages. (Draft reportedly issued Jan 18, 2002).
Invoice for Torsvik Delivery (in Sweden) dated Sep. 30, 2005, four (4) pages.
Filing of a new opposition filed with the EPO for European Patent No. 2048596 filed on Aug. 24, 2011, twenty-seven (27) pages.
Communication of a notice of opposition-first information to patent proprietor for European Patent No. 2048596 dated Sep. 2, 2011, one (1) page.
Notice of further opposition to opponents for European Patent No. 2048596 dated Sep. 30, 2011, one (1) page.
Communication of a notice of opposition and request to file observations for European Patent No. 2048596 dated Sep. 30, 2011, one (1) page.
Letter regarding the declaration for C. Saporetti, the opposition for European Patent No. 2048596, dated Nov. 14, 2011, two (2) pages.
Annexes to the letter of Nov. 14, 2011 for European Patent No. 2048596, dated Nov. 3, 2011, four (4) pages.
Brief communications-opposition proceedings for European Patent No. 2048596, dated Nov. 23, 2011, one (1) page.
Reply of Patent Proprietor to Notice(s) of Opposition for European Patent No. 2048596, dated Dec. 16, 2011, ten (10) pages.
English language translation prepared Mar. 2, 2012 of the Reply of Patent Proprietor to Notice(s) of Opposition for European Patent No. 2048596, dated Dec. 16, 2011, nine (9) pages.
Brief communication—Opposition proceeding for European Patent No. 2048596, dated Jan. 6, 2012, one (1) page.
General inquiry for European Patent No. 2026249, dated Januray 14, 2011, one (1) page.
Brief communication-Opposition proceedings for European Patent No. 2026249, dated Jan. 31, 2011, one (1) page.
Reply of the patent proprietor to the notice(s) of opposition for for European Patent No. 2026249, dated Apr. 4, 2011, seven (7) pages.
English language translation of the Reply of Patent Proprietor to Notice(s) of Opposition for European Patent No. 2026249, dated Apr. 4, 2011, seven (7) pages.
Brief communication—Opposition proceedings for European Patent No. 2026249, dated Apr. 14, 2011, one (1) page.
Datalogic S.p.A.—"Installation manual of the DV9500 camera," dated Oct. 2004, ninety (90) pages.
Datalogic S.p.A.—"Installation manual of the DD9500 decoder (extract)," dated Oct. 2004, six (6) pages.
Datalogic S.p.A.—"Installation manual of the DC9500 controller," dated Oct. 2004, seventy-six (76) pages.
Internal documentation on the sorter/conveyor interface for the Torsvik retrofitting project (extract), Project Swedish Post/ Beumer with DV9500 dated Aug. 19, 2011, five (5) pages.
Office Action, Final Rejection, U.S. Appl. No. 12/285,528, mailed on Oct. 27, 2011, eight (8) pages.

* cited by examiner

TAKING UNDISTORTED IMAGES OF MOVED OBJECTS WITH UNIFORM RESOLUTION BY LINE SENSOR

The claimed subject matter relates to an apparatus and to a method for taking undistorted images of a surface of objects moved on a conveying device in accordance with the exemplary embodiments disclosed herein.

Objects, for example parcels, are provided with a code for the automation of logistics tasks and said code is read out automatically on the sorting and association of parcels. Barcodes are particularly widespread which can be detected by barcode scanners. In addition, however, there are also two-dimensional codes such as the Maxicode or the Aztec Code or classical address letterings. Corresponding code readers are mounted above a conveyor for automatic sorting tasks, for instance in flight baggage handling or in logistics centers, and the objects provided with the code pass by said code readers and are sorted out to the respective direction after evaluation of the code information.

Code readers of the more recent generation are no longer based on a laser scanner, but rather on a camera chip. It is frequently made as a line which is perpendicular to or at an angle to the conveying direction and a total image is compiled gradually on the moving past of the objects. To be able to recognize codes on all object sides, that is to carry out an omnidirectional reading, a plurality of such line cameras are mounted above and beside the conveyor belt.

The total image composed from the lines is, however, frequently too distorted due to different perspectives to be able to be reliably evaluated. Object regions disposed further to the rear or surfaces of objects which are at an unsuitable angle to the line camera are taken at a lower resolution than a front side of the objects which is ideally even perpendicular to the line camera. Since the position of the objects is not always under control in practice, incorrect readings occur. A more or less distorted image makes the reading out of codes more difficult; in particular, however, an automatic text recognition (OCR) of address fields or other information. Object regions taken with distortion are also difficult to recognize with recorded image data, so-called video coding, for manual or external postprocessing. Moreover, it is difficult for common text recognition programs to process images which have a different resolution of the taken objects across the image regions.

An apparatus is known from US 2005/0036185 A1 having a line scanner which takes the image of an object moved past linewise and assembles it. This image is subsequently equalized using image processing software by which every taken line is rescaled so that all scan lines of the object are given the same resolution. Since the lines have already been taken at the moment of processing, this is only possible if every line is brought to the worst resolution among all lines. A uniform pixel resolution is therefore only obtained at the price of a worse image quality and of a computer-intensive postprocessing.

It is therefore the object of the invention to enable an image taking based on a line sensor which can generate high-quality non-distorted images of the surfaces of moved objects independent of the object location.

This object is satisfied by an apparatus having a geometry detection sensor and a line sensor in accordance with the exemplary embodiments disclosed herein. Since settings of the hardware are changed in accordance with the invention, each line is taken at a uniform and high resolution by adaptation of the zoom factor and it is achieved by a variation of the taking frequency that the lines also provide a uniform and high resolution of the total image across the object. This has the advantage that the hardware provides high-resolution and non-distorted images directly. In contrast to a subsequent processing in image processing software, images are therefore taken with the required information density and resolution right from the start so that no losses in quality have to be accepted. The solution in accordance with the invention is moreover fast because the data are already free of distortion directly on taking and do not require any reworking for equalization.

The invention therefore starts from the principle of preventing distortion factors directly at the source and of setting the hardware in each line such that non-distorted image data already arise directly on taking.

The term spacing profile used at this point designates in the general case a function which describes the distances from the object to the line sensor over the line direction. However, spacing profile should also be understood as the simplest cast of one single spacing value for the respective line which already completely defines the then constant spacing profile in the particularly frequent case of parallelepiped shaped objects and otherwise at least sets forth a good approximation in the case of objects of any desired shape.

In this respect, the control is preferably made to set the zoom factor such that the reading window in each case has an extent which corresponds to the absolute maximum object extent in the line direction over all the scanned lines of an object. The correct reference value, namely the object size, is thus selected as the scaling factor for the reading window whose extent is in a linear relationship with the zoom factor. If a lateral location of the line sensor is assumed, this object size is actually the maximum height. Since all the reading windows are set to this height, the object just fits into the total image at its largest extent so that the available resolution is ideally exploited.

The control is furthermore preferably made to set the taking frequency such that the scanned lines are distributed regularly over the geometrical surface. It must first be noted in this respect that the control does not actually control the taking frequency, but rather the interval between two shots by the line camera, that is actually the reciprocal of the taking frequency. However, the taking frequency, understood as a function of time, can be converted into the period via this reciprocal value relationship. The geometrical surface is meant as the actual absolute object surface, that is not the surface dependent on the slanted position of the object which presents itself from the perspective of the line camera. The taking frequency is therefore actually selected according to this further development such that the taken lines are distributed regularly over the actual object surface. The resolution is thus not only the same in the line direction which is set via the zoom factor, but also transversely to this line direction. The composed total image is therefore not only equalized in its two axes, but is additionally taken at a uniform resolution: in the one axis through the taking frequency, in the other axis through the zoom factor.

In an advantageous addition to the important named taking parameters of zoom factor and taking frequency, the control is also made to set a focal setting of the line sensor from a measure of the spacing profile, in particular from an extreme or a mean value, and/or to set a brightness of the line sensor via an exposure time or an amplification factor to compensate for changes which arise due to variation of the zoom factor and/or of the taking frequency. If the spacing profile, as in the case of parallelepiped shaped objects, is given by an individual spacing value, the named measured corresponds exactly to this spacing value. Extremes and the mean value then coincide in this spacing value. Since the focal location is an individual value, it cannot adapt to the total spacing profile, but only to an individual characteristic value, that is this measure.

Due to the focal setting, the line sensor delivers a sharp image in every line. Since, in accordance with the invention, different taking parameters are varied from line to line, a regular brightness can only be ensured when a corresponding readjustment is carried out. As long as the taking frequency is sufficiently low that time remains to vary the exposure time, this is a possible measure. Otherwise, amplification parameters must be readjusted to increase the brightness in regions of higher taking frequency or of a higher zoom factor. It is ensured by this measure that no brightness differences occur which would anyway for the larger part be an artifact of the varied taking parameters and are without any exploitable information content and that a uniformly bright total image is obtained. This observation of using a scalar measure of the spacing profile for the scalar taking parameters applies analogously to all taking parameters of zoom factor, taking frequency and focal location, while the amplification factors for the brightness can alternatively also be adapted per pixel to the total spacing profile.

In a further development, the geometry detection sensor is integrated into the line sensor. This method, in which a current object spacing in the reading window is used to control the focus, is known for autofocus systems. The zoom factor and the taking frequency can also be correspondingly controlled as long as the zoom reacts fast enough. The advantage is an extremely compact apparatus which manages without an additional geometry detection sensor.

Alternatively, the geometry detection sensor is disposed before the line sensor in the conveying direction and the control is made to calculate the spacing profile in advance in dependence on the conveying position of the objects. Sufficient time remains in this manner to provide the varying taking parameters in good time and to meet the requirements of the inertia of the focal system and zoom system, particularly at higher conveying speeds.

In this respect, a speed sensor is preferably provided which can determine the conveying speed, with the control being able to convert the zoom factors and/or taking frequencies dependent on the conveying position by means of the conveying speed into time-dependent zoom factors and/or taking frequencies. The conveying speed is therefore utilized to displace the object geometry quasi virtually to simulate the situation that the just measured geometry is disposed in the reading window. Since time-dependent zoom factors and time-dependent taking frequencies are calculated therefrom, the control of the line sensor can be carried out using the decisive reference system preferred for it, namely the time.

Even more preferably, the speed sensor is implemented as one of the following: an incremental encoder at the conveying device and/or a speed evaluation device at the geometry detection sensor or at the line sensor which can evaluate a distortion of expected object contours and/or a comparator which recognize an object feature in the geometry data and in the image data again and determines the speed from the time difference of the data taking and the spacing of the geometry detection sensor and the line sensor. Incremental decoders are know as reliable speed meters of a conveying device, but require an additional component. No further sensor is needed using the possibilities to determine the speed via the object contours or the required time in which the object covers the path from the geometry detection sensor to the line sensor, but rather an integrated evaluation is sufficient.

The control is advantageously made to calculate the spacing profiles at each conveying position corresponding to a maximum or preset constant taking frequency of the line sensor. The geometry of the object is taken into account particularly precisely in this manner and a particularly non-distorted and uniformly resolved total image arises.

Alternatively, the control is made to calculate spacing profiles only for recorded conveying positions in which in particular corners or edges of an object are located in the reading window and the conveying positions disposed therebetween are interpolated in step-form or linearly, with in particular the control also being able track the zoom factors an/or the taking frequency in step-form or linearly. The much larger number of objects to be sorted are rectangular so that a more precise taking into account of the object contours generates an unnecessary calculation effort. The assumption of simple object surfaces in a correspondingly simplified tracking of the taking parameters is implemented with the named advantageous further development. It is sufficient to set the zoom and the taking frequency at a corner point and then to preset a constant change from line to line until a further corner point is reached ("zoom ramping", analogously also "focus ramping" or "brightness ramping"). This substantially facilitates the evaluation and control.

In a preferred further development, the control is made to extrapolate spacing profiles in lines in the environment of an object from spacing profiles of the object margin to allow a soft transition. This is in particular of help for the edge which first enters into the reading window. Since the object contours are extended virtually to the front, the zoom or focus can already be guided into the required location at an early time and their inertia can thus be compensated.

In a specific preferred embodiment, the control is made to set the line sensor to a base zoom factor and/or to set a base taking frequency which correspond to a reference spacing profile and to set differences from line to line differentially with respect to the previous line or with respect to the base zoom factor and to the base taking frequency. The reference position can be the height of the conveying device; but it can better be an approximately mean object height to be expected. The focus and zoom must thus only be tracked by a small change in most cases, which both helps the mechanics and largely prevents slow reactions due to inertia again.

The geometry detection sensor is advantageously a laser scanner or an image sensor, in particular a distance-resolving image sensor. The laser scanner measures spacings from objects and the conveyor belt from the time of flight of a transmitted light pulse received again or from a phase shift of transmitted modulated light. A very precise determination of the object geometry is thus possible. A general image sensor can determine objects on the basis of an image evaluation, for instance with reference to their color, shape or the remission properties. The use of image sensors is also conceivable which can independently also determine a distance on the basis of a time of flight method in addition to the customary color or brightness data of their pixels. Such image sensors are available as PMD chips (photon mix detection) on a CMOS base.

The control is preferably made to relate the spacing profile to the foremost object or rearmost object considered from the line sensor on the presence of a plurality of objects in the reading field or in each case to calculate the foremost spacing profile with an incomplete detection of objects. The line sensor cannot detect objects in the shadow. It should therefore be determined in advance which object contour the line sensor should be set to. If it takes the foremost contour in each case, no information is lost. If it concentrates in advance on the front or rear object, it must be ensured that the object passed over can also be read and evaluated by another line sensor.

In an advantageous further development, a postprocessing unit is provided which is made for the digital postprocessing for the further equalization of the image data, with the control transferring parameters relevant to the distortion to the postprocessing unit, in particular the slanted location of an object or the conveying speed. Although in accordance with the invention directly equalized images are taken, a residual distortion can remain, for instance because no zoom lens is present and so only the taking frequency can be modified or because the maximum taking frequency is not sufficient to takes this almost remote side with sufficient resolution due to an extremely sharp angle with an almost parallel location of an object surface with respect to the line sensor. Filler lines can then be inserted digitally, for example, the lines can be rescaled or image processing filters can be used. It is thus ensured that the information taken is available in the best possible preparation and in processable format with the expected resolution at least for subsequent image processing facilities such as text recognition. The digital postprocessing is considerably facilitated when parameters such as the slanted position or the speed do not have to be determined in the postprocessing unit itself because they are transferred.

The method in accordance with the invention can be further developed in a simple manner and shows similar advantages. Such advantageous features are described in exemplary, but not exclusive, manner in the dependent claims following the independent claims.

The invention will also be described in more detail by way of example in the following with respect to further features and advantages with reference to embodiments and to the enclosed drawing. The Figures of the drawing show in.

Figure 1:
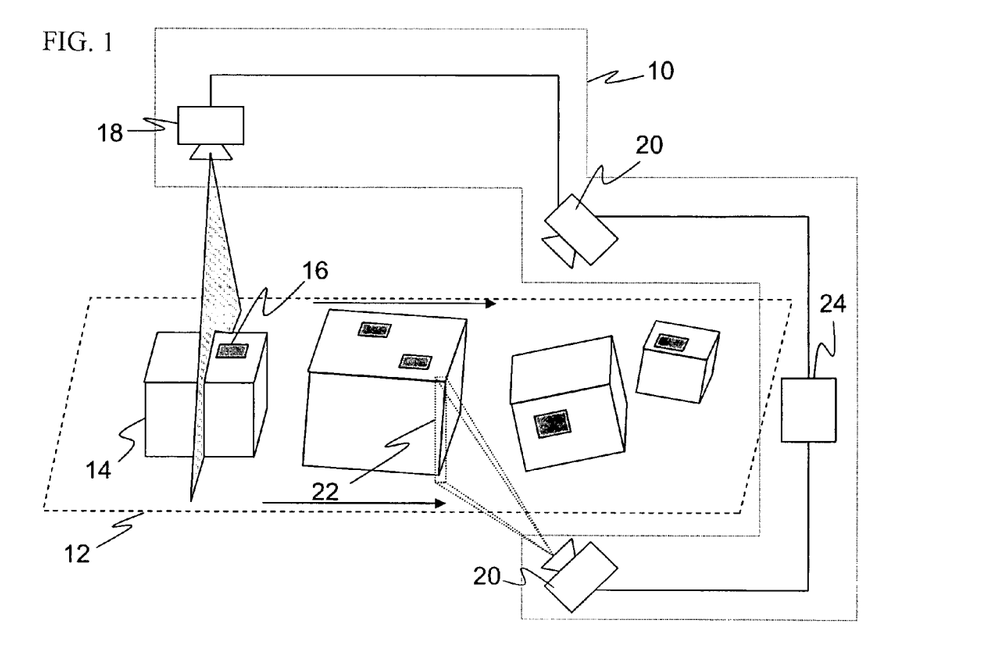
FIG. 1 a schematic three-dimensional representation of an embodiment of the apparatus in accordance with the invention over a conveyor belt with a plurality of objects moved thereon.

FIG. 1 shows, in a three-dimensional schematic representation, an embodiment of the reading apparatus 10 in accordance with the invention which is mounted above a conveyor belt 12 on which objects 14 are moved in the direction indicated by arrows. The objects 14 bear code information 16, for example barcodes, two-dimensional codes or address names which it is the task of the reading apparatus 10 to read. A geometry detection sensor 18 disposed at the front with respect to the conveying direction takes the geometrical profile of the objects 14 moved past it. The geometry detection sensor 18 can be made as a laser scanner which measured the spacings of the objects 14 using a time of flight method. Alternatively, the geometry detection sensor 18 can be an image sensor and the object geometry is determined by means of an image evaluation method. In a combination of both principles, the geometry detection sensor 18 is made as a distance-measuring sensor, for example by means of photon mix detection or triangulation (actively with illumination pattern or passively with stereoscopy).

Line sensors 20 (referred to as cameras 20, side cameras 20, or line cameras 20 in certain exemplary embodiments) which are mounted at different sides of the conveying device 12 take the actual image data from which the code information 16 should be extracted. If the geometry detection sensor 18 is made as an image sensor, it can also take over the function of one of these line sensors 20. The line sensors 20 are capable of taking a respective image line in their field of view, namely within a reading field 22. Two side cameras 20 are shown in FIG. 1. In further applications, more or fewer cameras 20 can be use in dependence on the directions in which objects 14 can bear code information 16. The line sensors 20 preferably have linear image sensors, that is, for instance CCD chips or CMOS chips. A control 24 which receives geometrical data from the geometry detection sensor 18 and can control taking parameters of the line camera 20 is connected to the geometry detection sensor 18 and the line cameras 20. Conversely, the control 24 receives image data of the respective taken line in the reading field 22 and is capable of compiling these image data read out linewise to form a total image and to provide it to further processing devices.

Figure 2A:
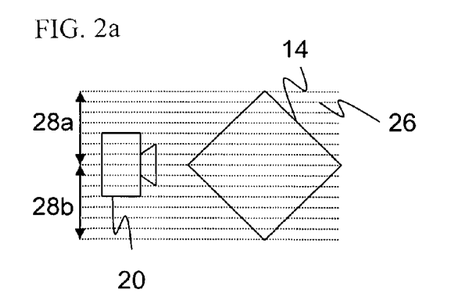
FIG. 2a a plan view of a line camera and an object at an ideal 45° angle with a uniform taking frequency.
Figure 3A:
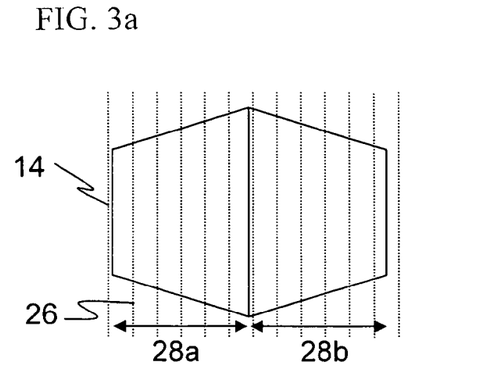
FIGS. 3a-3c a representation in accordance with FIGS. 2a-2c in each case as a side view from the view of the line camera.

FIG. 2a shows, from a plan view, the location of a parallelepiped shaped object 14 disposed in a straight manner on the conveying device 12 with respect to a side camera which is arranged at an angle of 45°. FIG. 3a shows the same situation from the perspective of the camera 20. Here as in the following, the same features are marked by the same reference numerals. This arrangement of the side camera 20 is preferred since the front surfaces and a side surfaces of a parallelepiped shaped object 14 disposed in a straight manner are recognized equally well from a 45° angle. Different times at which the line camera takes a line are drawn with dashed lines. In reality, the line camera 20 can only take the line 26 disposed at the center since the line camera is fixed. The different dashed lines 26 should therefore represent different conveying positions of the object 14 which is moved past the line camera 20 in a time sequence. If the object 14 is disposed in a straight manner, the taking lines 26 are distributed uniformly over the object so that a uniform resolution of the total image in the conveying direction results. This is also reflected in the two equally long arrows 28a, 28b which represent the apparent size of the front and side surfaces from the view of the line camera.

Figure 2B:
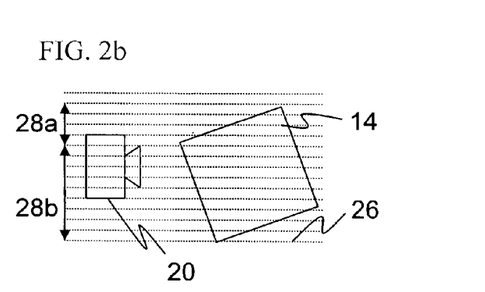
FIG. 2b a plan view in accordance with FIG. 2a with an object at an angle different from the ideal 45° with a uniform taking frequency.

In FIG. 2b, likewise in a plan view, the location of an object 14 disposed slantingly on the conveyor device 12 is shown for comparison in a taking method according to the prior art. FIG. 3b again shows the same situation from the perspective of the camera. A regular taking frequency, that is uniformly spaced apart reading lines 26, has the result that the front surface is taken at a higher resolution than the side surface which is reduced in size from the view of the line camera 20 due to the perspective (arrow 28a versus arrow 28b). Fewer taking lines 26 therefore cross the side surface which is therefore taken at a lower resolution. This results in distortion of the total image or at least in an irregular resolution which makes evaluations of the total image difficult.

Figure 2C:
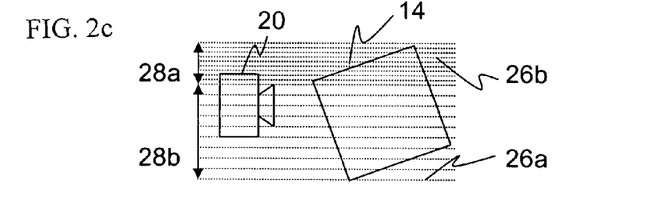
FIG. 2c a plan view in accordance with FIG. 2c with an object at an angle differing from the ideal 45° with a taking frequency dynamically adapted to the object geometry and object location.
Figure 3B:
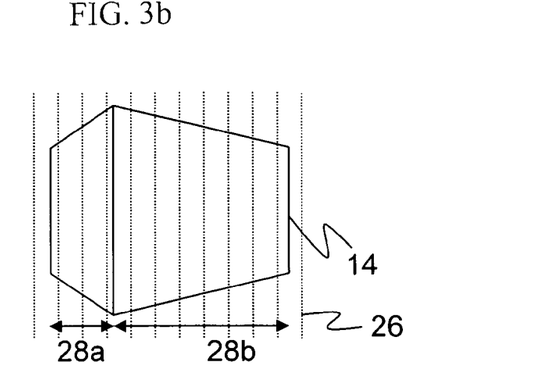
Figure 3C:
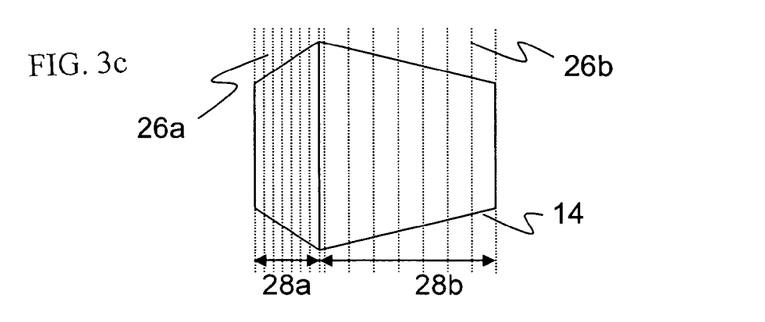

In contrast, in accordance with the invention, as shown in plan view in FIG. 2c and from the perspective of the camera in FIG. 3c, the taking frequency is varied. The front surface inclined toward the line camera 20 is taken at a lower taking frequency than the side surface inclined away from the line camera 20. The ratio of the taking frequencies which can be read from the different density of the scanned lines 26a and 26b just corresponds to the inverse ratio of the apparent sizes which are shown by arrows 28a and 28b.

The control 24 therefore calculates the location of the object 14 in advance from the perspective of the line camera 20 and determines a modified taking frequency from it which is correspondingly higher when an object surface is inclined away from the line camera 20 than when this object surface faces toward the line camera 20. The conveying speed of the conveying device 12 is taken into this calculation, said speed being known by external incremental encoders or internal calculations from the recognition of the same objects or distortion from the expected rectangular shape of the parallelepiped surfaces.

To limit the image data quantity, provision can be made for the taking frequency always to be set to zero or at least to be dramatically decreased when no object 14 is disposed in the reading window 22 of the line camera 20.

Figure 4A:
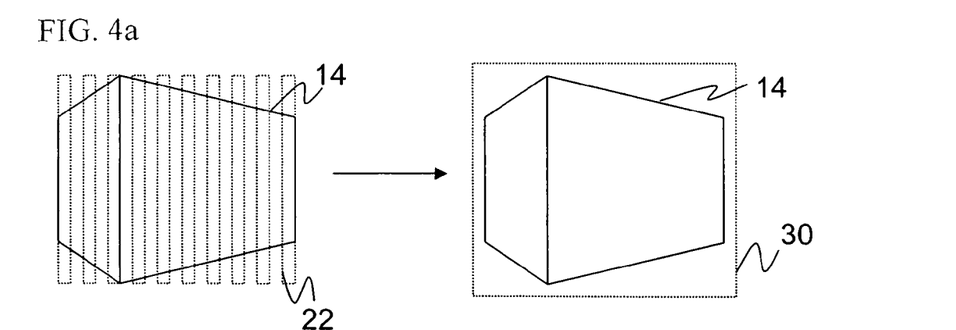
FIG. 4a a side view of the line camera of a slanted object and the arising total image with a constant zoom factor.

FIG. 4a illustrates a further problem which results in image distortion on the taking of a total image with the help of a line camera. Object surfaces or parts of object surfaces disposed further behind are smaller than those disposed further forward from the view of the camera. With a constant zoom factor, the reading windows 22, however, have a constant extent independently of this apparent object size. The actually rectangular side surfaces of the object 14 therefore appear as trapezoids in the total image 30 which the control 24 composes from the individual lines.

Figure 4B:
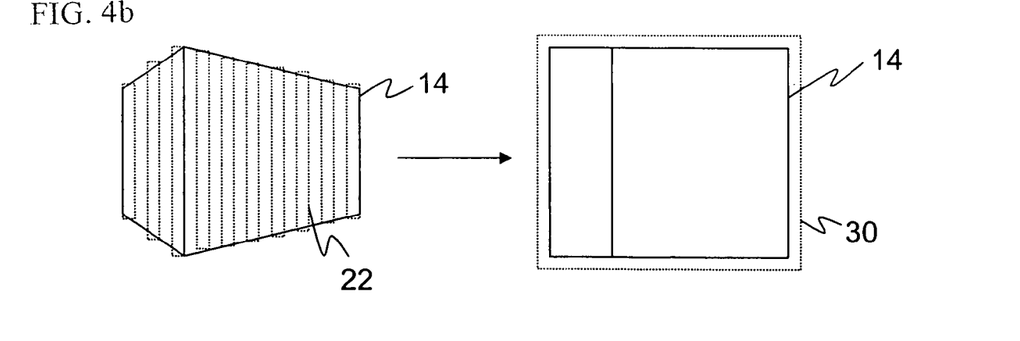
FIG. 4b a side view in accordance with FIG. 4a with a zoom factor dynamically adapted to the object geometry and the object location.

In accordance with the invention, as shown in FIG. 4b, each reading window 22 is adapted to the object size 14 by a corresponding choice of the zoom factor. The front surfaces therefore become rectangles in the total image 30, that is the perspective effects dependent on the object location which result in the trapezoids are equalized. If the object 14 is not parallelepiped in shape as shown, the reading windows 22 are adapted to the largest height of a surface of the object 14. If the reading windows also followed an irregular contour of the object 14, an artificial distortion in turn arises because a rectangular shape would be imposed.

Figure 5:
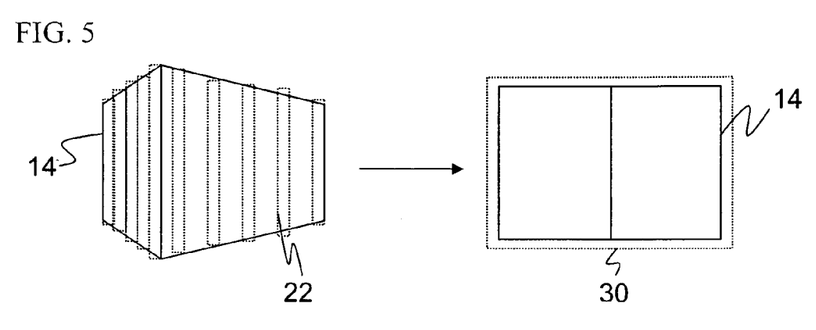
FIG. 5 a side view in accordance with FIG. 4a both with a taking frequency dynamically adapted to the object geometry and the object location and with an adapted zoom factor.

The adaptation of the taking frequency described in connection with FIGS. 2 and 3 and the adaptation of the zoom factor described in connection with FIG. 4 can also be combined. This is shown in FIG. 5. In this connection, the reading windows 22a are arranged via the taking frequency at a greater spacing from one another on the forwardly inclined apparently larger front surface than the reading windows 22b on the remotely inclined and apparently smaller side surface. In addition, all the reading windows 22a, 22b are adapted via the zoom factor to the height of the object 14. The result is a total image 30 in which the surfaces of the object 14 are rectangular without distortion as if they had been taken from a perpendicular perspective.

In the previously described embodiment, only respective parallelepiped shaped objects 14 were considered. In the case of objects of irregular shape, the zoom factor must, on the one hand, as already described, be related to a maximum extent, that is to a maximum height from the view of the lateral line camera 20. In a similar manner, the taking frequency depends directly on the angle at which the line camera 20 sees the surface region of the object 14 instantaneously present in the reading window 22. In this connection, the irregularity of the object can have the result that the spacings also vary over the line of the measuring window 22, that is that a spacing profile results here. This spacing profile then has to be converted back to a single value by a suitable measure, for example an extreme or a mean value. More complicated, application-related measures are conceivable. A simple possibility of taking account of non-parallelepiped shaped objects 14 is to determine an enveloping parallelepiped and to relate all the taking parameters to this parallelepiped.

Equally, only the respective perspective of a laterally arranged line camera 20 was described. The invention equally includes all the other conceivable locations of the line camera 20, with it having to be observed that some camera positions profit a lot less from the invention. An example for this would be a camera arranged perpendicularly above the conveying device when the conveyed objects 14 are of parallelepiped shape. In this case, a dynamic adaptation of the zoom factor or of the taking frequency is not necessary.

Differing from the representation in FIG. 1, it is also conceivable that the geometry detection sensor 18 is integrated into the line camera 20. The same applies to the control 24. However, it must be noted for the geometry detection sensor 18 that inertia in the setting of the zoom factor can be taken into account with a great deal more difficulty if the geometrical data are only available with delay.

In addition to the two taking parameters of zoom factor and taking frequency, in accordance with the invention, the focal position can also be adapted to the respective geometry. The required focal spacing can be determined from the geometrical data in a simple manner. Furthermore, the brightness of the image data also varies due to the zoom settings and due to a change in the taking frequency. This can be compensated, as long as the maximum taking frequency has not yet been reached, by an extension of the exposure time, in any case by an increase in the amplification. The required modification of the brightness can be derived both from the geometry and from changes in the brightness of adjacent pixels which are not to be expected with a uniform parcel surface.

It can be advantageous for various reasons to digitally postprocess the image data equalized by means of hardware. A technically induced maximum taking frequency is, for example, the limit for the adaptation with extremely tight angles of incidence of the perspective of the line sensor. The resolution can then be kept constant digitally at least by doubling image information or by similar filters. A postprocessing of the brightness or a further resealing on the basis of the geometrical data or conveying speeds also transferred can also take place. Other algorithms for postprocessing are conceivable.

Figure 6A:
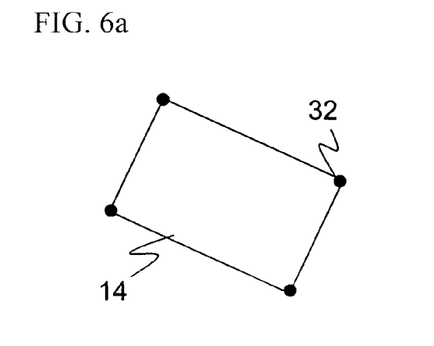
FIG. 6a a schematic plan view of an object for the explanation of the recorded conveying positions and of the interpolation with a parallelepiped shaped object.
Figure 6B:
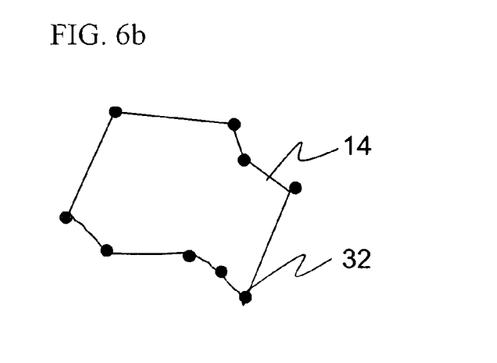
FIG. 6b a plan view in accordance with FIG. 6b with an object of irregular shape.

In accordance with an embodiment of the invention, the spacing profiles and thus the zoom factors and the taking frequency are calculated anew for each line position. FIG. 6 illustrates a simpler method which is based on interpretation and which in particular works very well with regularly shaped objects 14. A parallelepiped shaped parcel 14 is shown in a plan view in FIG. 6a. The transitions 32 are recognized as marked points, namely corners of the parcel 14. A linear behavior is assumed between the points 32. The zoom factor and the taking frequency are therefore calculated at the point 32 together with a differential gradient parameter. Only the gradient parameter is then added in each case up to the next point 32 so that no further calculations are necessary. The taking parameter of the line camera 20 is therefore modeled in a linear manner as a kind of ramp. Other functions are also conceivable instead of a linear interpolation, for example a step function which addresses the mechanics of the zoom and of the focus less frequently. The interpolation method also works with the parcel 14 of irregular shape shown in FIG. 6b; however, the part distances which can be interpolated between two points 32 are substantially shorter so that a new calculation becomes necessary more frequently. In this connection, points 32 are always set when the angle or the accumulated angle exceeds a minimum angle in a curve of the outer contour of the object 14.

Figure 7A:
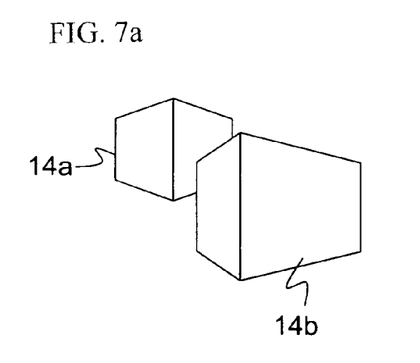
FIG. 7a a schematic three-dimensional representation of a situation in which a rear object is shadowed by a front object form the view of the line camera.
Figure 7B:
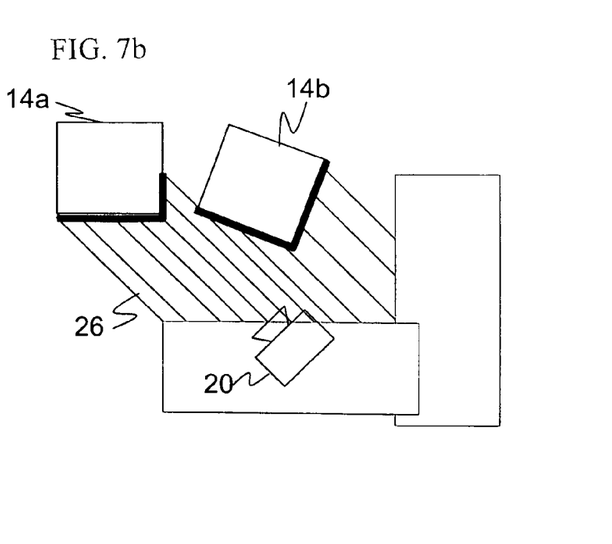
FIG. 7b a plan view in accordance with FIG. 7a for the explanation of the object contours selected for taking by the control for the line camera.

FIG. 7 shows a situation in which a rear object 4a is covered partially by a front object 14b from the view of the line camera 20. In this situation, the control 24 must decide the object 14a, 14b on which the line sensor 20 is focused. The solution in accordance with FIG. 7b is in each case to take the contour disposed closest to the line camera 20. It would alternatively be conceivable to determine in advance in the control 24 that the rear object 14a can anyway not be read completely and to concentrate only on the front object 14b. Conversely, only the rear object 14a could also be read out, for instance because it is known from another source that the front object 14a does not bear any code information on the surfaces inclined toward the line camera 20 or had already been read out by another line camera 20. Finally, that object can be selected in each case which offers the larger absolute surface because the probability of finding relevant information is larger there.

In accordance with the invention, in summary, uniformly resolved and distortion-free total images are generated at the hardware side which correspond to an image which is taken from a perpendicular perspective although the objects 14 are moved on the conveying device 12 in an unfavorable slanted position with respect to the line sensor 20. Such total images can be further processed much more easily with respect to text recognition and further evaluations than, for instance, a video coding The reading out of information is also facilitated and made more precise.

The invention claimed is:

1. An apparatus for the taking of undistorted images of a surface of objects moved on a conveying device, comprising:
    a geometry detection sensor configured to detect a geometry of the objects with reference to at least one of spacing data and remission behavior of the objects;
    a line sensor configured to scan the objects linewise for the generation of image data of the surface in a linear reading window which forms an angle with the conveying direction; and
    a control configured:
        to extrapolate spacing profiles in lines in an environment of an object from spacing profiles of the object margin to allow a soft transition;
        to generate, on the basis of geometrical data of the geometry detection sensor, a respective spacing profile of the surface over the reading window from the perspective of the line sensor and to vary a taking frequency for the line sensor from each spacing profile according to the geometry of the objects as taken from the perspective of the line sensor;
        to set the line sensor to the associated taking frequency for the respective line of the objects to be scanned; and
        to compose the image data thus taken linewise in an undistorted manner to form a uniformly resolved total image of the surface.

2. An apparatus in accordance with claim 1, wherein the control is configured to set a zoom factor such that the reading window in each case has an extent which corresponds to a maximum object extent in a line direction over all scanned lines of an object.

3. An apparatus in accordance with claim 1, wherein the control is configured to set the taking frequency such that the scanned lines are distributed in a regular manner over the geometrical surface.

4. An apparatus in accordance with claim 1, wherein the control is configured to set a focus setting of the line sensor from a measure of the spacing profile, in particular from an extreme or a mean value; and/or
    to set a brightness of the line sensor via an exposure time or via an amplification factor to compensate changes which arise due to variation of the zoom factor and/or of the taking frequency.

5. An apparatus in accordance with claim 1, wherein the geometry detection sensor is integrated into the line sensor.

6. An apparatus in accordance with claim 1, wherein the geometry detection sensor is disposed in front of the line sensor in the conveying direction; and
    wherein the control is configured to calculate the spacing profile in advance in dependence on the conveying direction of the objects.

7. An apparatus in accordance with claim 6, wherein a speed sensor is provided which can determine the conveying speed; and
    wherein the control is configured to convert the zoom factors and/or taking frequencies dependent on the conveying position by means of the conveying speed into time-dependent zoom factors and/or taking frequencies.

8. An apparatus in accordance with claim 7, wherein the speed sensor is implemented as one of the following:
    an incremental encoder at the conveying device; and/or
    a speed evaluation device at the geometry detection sensor or at the line sensor which is configured to evaluate a distortion of expected object contours; and/or
    a comparator configured to recognize an object feature in the geometry data and in the image data again and determine the speed from the time difference of the data taking and the spacing of the geometry detection sensor and the line sensor.

9. An apparatus in accordance with claim 6, wherein the control is configured to calculate the spacing profiles for each conveying position corresponding to a maximum or preset constant taking frequency of the line sensor.

10. An apparatus in accordance with claim 6, wherein the control is configured to calculate spacing profiles only for marked conveying positions in which in particular corners or edges of an object are located in the reading window; and
    to interpolate the conveying positions disposed therebetween in step form or linearly, with in particular the control also being able to track the zoom factors and/or the taking frequency in step form or linearly.

11. An apparatus in accordance with claim 1, wherein the configuration of the control to extrapolate spacing profiles in lines in an environment of an object from spacing profiles of the object margin to allow a soft transition extends object contours virtually, so as to allow guiding of the zoom or focus into a required location at an early time.

12. An apparatus in accordance with claim 1, wherein the control is configured to set the line sensor to a base taking frequency which corresponds to a reference spacing profile and to set differences from line to line differentially with respect to the preceding line or with respect to the base taking frequency.

13. An apparatus in accordance with claim 1, wherein the geometry detection sensor is selected from the group consisting of (a) a laser scanner, (b) an image sensor, and (c) a distance-resolving image sensor.

14. An apparatus in accordance with claim 1, wherein the control, when a plurality of objects are present in the reading field, is configured to relate the spacing profile to the foremost object or hindmost object from the line sensor or to calculate the foremost spacing profile in each case with an incomplete detection of the object.

15. An apparatus in accordance with claim 1, wherein a postprocessing unit is configured for digital postprocessing for the further equalization of the image data; and
  wherein the control is configured for transferring parameters relevant to the distortion, in particular the slanted position of an object or the conveying speed.

16. An apparatus in accordance with claim 1, wherein the control is further configured to generate an associated zoom factor for the line sensor from each spacing profile.

17. A method for the taking of undistorted images of a surface of objects moved on a conveying device, comprising:
  detecting a geometry of the objects with reference to at least one of spacing data and remission behavior of the objects;
  extrapolating spacing profiles in lines in an environment of an object from spacing profiles of the object margin to allow a soft transition;
  scanning the objects by a line sensor linewise for the generation of image data of the surface in a linear reading window which forms an angle with the conveying direction;
  generating a respective spacing profile of the surface over the reading window from the perspective of the line sensor;
  varying a taking frequency for the line sensor from each spacing profile according to the geometry of the objects as taken from the perspective of the line sensor;
  scanning the respective line of the objects to be scanned at the associated taking frequency; and
  composing the image data thus taken linewise in an undistorted manner to form a uniformly resolved total image of the surface.

18. A method in accordance with claim 17, wherein the zoom factor is set in each case such that the reading window has an extent of the absolute maximum object extent in a line direction over all scanned lines of an object and/or the taking frequency is set such that the scanned lines are disposed regularly over the geometrical surface.

19. A method in accordance with claim 17, wherein the spacing profile is calculated in advance in dependence on the conveying position of the objects; and
  wherein the conveying speed is determined to convert the zoom factors and/or taking frequencies dependent on the conveying position into time-dependent zoom factors and/or taking frequencies.

20. A method in accordance with claim 19, wherein spacing profiles are only calculated for marked conveying positions in which in particular corners or edges of an object are located in the reading window and the conveying positions disposed therebetween are interpolated in step form or linearly and the zoom factors and/or the taking frequency being tracked accordingly in step form or linearly.

\* \* \* \* \*